(12) United States Patent  
Lee

(10) Patent No.: US 6,662,823 B2  
(45) Date of Patent: Dec. 16, 2003

(54) AUTO FLOW REGULATOR

(75) Inventor: Euiho Lee, Incheon (KR)

(73) Assignee: Samyang Comprehensive Valve Co., Ltd., Gyonggi-do (KR)

( * ) Notice: Subject to any disclaimer, the term of this patent is extended or adjusted under 35 U.S.C. 154(b) by 94 days.

(21) Appl. No.: 09/985,474

(22) Filed: Nov. 5, 2001

(65) Prior Publication Data

US 2003/0084940 A1 May 8, 2003

(51) Int. Cl.⁷ .......................... F16K 31/126; G05D 7/01
(52) U.S. Cl. ..................................................... 137/501
(58) Field of Search ................................. 137/501, 503

(56) References Cited

U.S. PATENT DOCUMENTS

| 4,250,915 A | * | 2/1981 | Rikuta | ........................ 137/501 |
| 5,775,369 A | * | 7/1998 | Hagmann | .................... 137/501 |

FOREIGN PATENT DOCUMENTS

CZ          72673    *   1/1944   .................. 137/501

* cited by examiner

Primary Examiner—Stephen M. Hepperle  
(74) Attorney, Agent, or Firm—Greenblum & Bernstein, P.L.C.

(57) ABSTRACT

Quantity of fluid can be more precisely controlled without disassembling the valve by an automatic flow control valve, which can be quietly operated and repaired and maintained in simple and easy manner. In the control valve, a valve body has a fluid channel and a chamber, which are formed in the valve body and communicate with each other. A diaphragm is disposed in the chamber and has a fluid channel switching shaft connected to one surface thereof. A flow control member is assembled with the valve body and extends toward the fluid channel. A fluid transfer hole communicating with an entrance port is formed at an upper portion of a side surface of the chamber, so that an opening degree of the fluid channel can be automatically controlled by the fluid channel switching shaft connected with the diaphragm when the diaphragm is operated by pressure of the fluid transferred through the fluid transfer hole.

5 Claims, 2 Drawing Sheets

AUTO FLOW REGULATOR

BACKGROUND OF THE INVENTION

1. Field of the Invention

The present invention relates to an automatic control valve, and more particularly to an automatic flow control valve having an improved construction, by which the quantity of fluid can be more precisely controlled according to the necessity even without disassembling the valve, and which has a relatively large range of controlling the quantity of fluid, so that the valve can flexibly cope with a change in a piping system, and can be repaired and maintained in simple and easy manner.

2. Description of the Prior Art

In a general piping system, how precise quantity of fluid can be supplied to sections of the piping system connected with each other is a very important problem. In order to solve the problem, when the piping system is designed and constructed, a complicated process of repetitive calculations of various factors such as diameters of pipes and frictional loss has been necessary up to now. Further, even after the piping system is constructed in the complicated process as described above, when it is necessary to change the quantity of fluid or when there happens a change in the quantity of fluid due to such reasons as an accumulation of alien material according to aging of the piping system, the piping system has to be subjected to a balancing treatment through a complicated process.

However, even though the automatic flow control valve has been balanced to a certain degree through the complicated process as above, it is just a temporary balance, and the piping system may be come into an unbalanced state when even a small change happens in the system. Therefore, developed and used has been an automatic flow control valve, which can flexibly cope with such a change of the system and thereby enable a constant quantity of fluid to flow therein.

FIG. 1 shows an exemplary conventional automatic flow control valve. Referring to FIG. 1, the conventional automatic flow control valve includes a housing 40 having a fluid channel 41 formed therein, a ring member 53 fixed in the fluid channel 41, a control member 50 slidably fitted in the ring member 53, and a spring 55 elastically supporting the control member 50 toward an entrance port 41a of the fluid channel 41. The control member 50 has a shape of a cup and has a plurality of slots 51, which are formed through a side portion of the control member 50 and through which fluid can pass. In this case, when the control member 50 is moved forward and backward centering around the ring member 53 by the pressure changes of fluid in the fluid channel 41, an area, through which the fluid passes, is changed according to the number of the slots 51 exposed to the side of the entrance port 41a. Further, the control member 50 is classified into several kinds thereof according to the dimensions thereof, so that the control member 50 of a corresponding size can be fitted in and can control the quantity of fluid passing through a flow control valve of a predetermined size.

In result, when the pressure of fluid introduced in the valve increases, the control member 50 is moved backward against the elastic force of the spring 55, so that the number of the slots 51 exposed to the side of the entrance port 41a is reduced and thereby the fluid at a high pressure passes through the reduced slots with a reduced total area. In contrast, when the pressure of fluid decreases, the control member 50 is moved forward by the elastic force of the spring 55, so that the number of the slots 51 exposed to the side of the entrance port 41a increases and thereby the fluid at a low pressure passes through the increased slots with an increased total area. Therefore, the quantity of fluid flowing through the fluid channel can be maintained always constant by the automatic control of the flow control valve.

However, when it is necessary to change the quantity of fluid passing through the automatic flow control valve due to such reasons as a change of the piping system while the automatic flow control valve is used, the automatic flow control valve has to be completely disassembled one component by one component. Thereafter, the control member 50 has to be replaced by one having a different size, and then the valve has to be reassembled. Such a complicated labor of assembling and disassembling the automatic flow control valve causes inconvenience to a user of the valve. Moreover, the flow control method by a replacement of the control member 50 is problematic in that the quantity of fluid cannot be precisely controlled but can be controlled only between a few steps by several kinds of control members the control member 50, which are manufactured in advance.

Furthermore, in the automatic flow control valve, since the fluid-passing area is controlled while the control member 50 is slid in contact with the inner circumference of the ring member 53 by the pressure of the fluid, there is generated metallic noise, which is very unpleasant, due to the friction between the control member 50 and the ring member 53. Further, since the fluid-passing area is controlled by means of the slots 51 formed through the control member 50, which have a relatively small area and thereby have a relatively small range of controlling the quantity of fluid, it is difficult to flexibly cope with the change of pressure.

In the conventional automatic flow control valve as described above, when alien material has been accumulated in the valve after the valve is used for long time, the valve has to be disassembled one component by one component, the alien material is eliminated, and then the valve is assembled again. Therefore, it can be said that it is very difficult to repair and maintain the conventional automatic flow control valve.

SUMMARY OF THE INVENTION

Accordingly, the present invention has been made to solve the above-mentioned problems occurring in the prior art, and an object of the present invention is to provide an automatic flow control valve having an improved construction, by which the quantity of fluid can be more precisely controlled according to the necessity even without disassembling the valve, and which has a relatively large range of controlling the quantity of fluid, so that the valve can flexibly cope with a change in a piping system.

It is another object of the present invention to provide an automatic flow control valve having an improved construction, which generates no operational noise but can be quietly operated, and which can be repaired and maintained in simple and easy manner.

In order to accomplish this object, there is provided an automatic flow control valve comprising: a valve body having a fluid channel and a chamber, which are formed in the valve body and communicate with each other, the fluid channel having an entrance port and an exit port; a diaphragm disposed in the chamber and having a fluid channel switching shaft connected to one surface of the diaphragm; a spring elastically supporting the diaphragm in a direction of opening the fluid channel; and a flow control means assembled with the valve body and extending toward a portion of the fluid channel, which is disposed in front of or behind the fluid channel switching shaft, wherein a fluid transfer hole communicating with an entrance port is formed at an upper portion of a side surface of the chamber, so that an opening degree of the fluid channel can be automatically controlled by the fluid channel switching shaft connected with the diaphragm when the diaphragm is operated by pressure of the fluid transferred through the fluid transfer hole.

It is preferred that, in the automatic flow control valve, the flow control means comprises a cover detachably assembled at one side of the valve body, and an adjusting screw, which is screw-assembled with the cover and protrudes toward the fluid channel, so as to adjust an opening degree of the fluid channel, so that the quantity of fluid passing through the automatic flow control valve can be controlled by tightening and loosening the adjusting screw.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
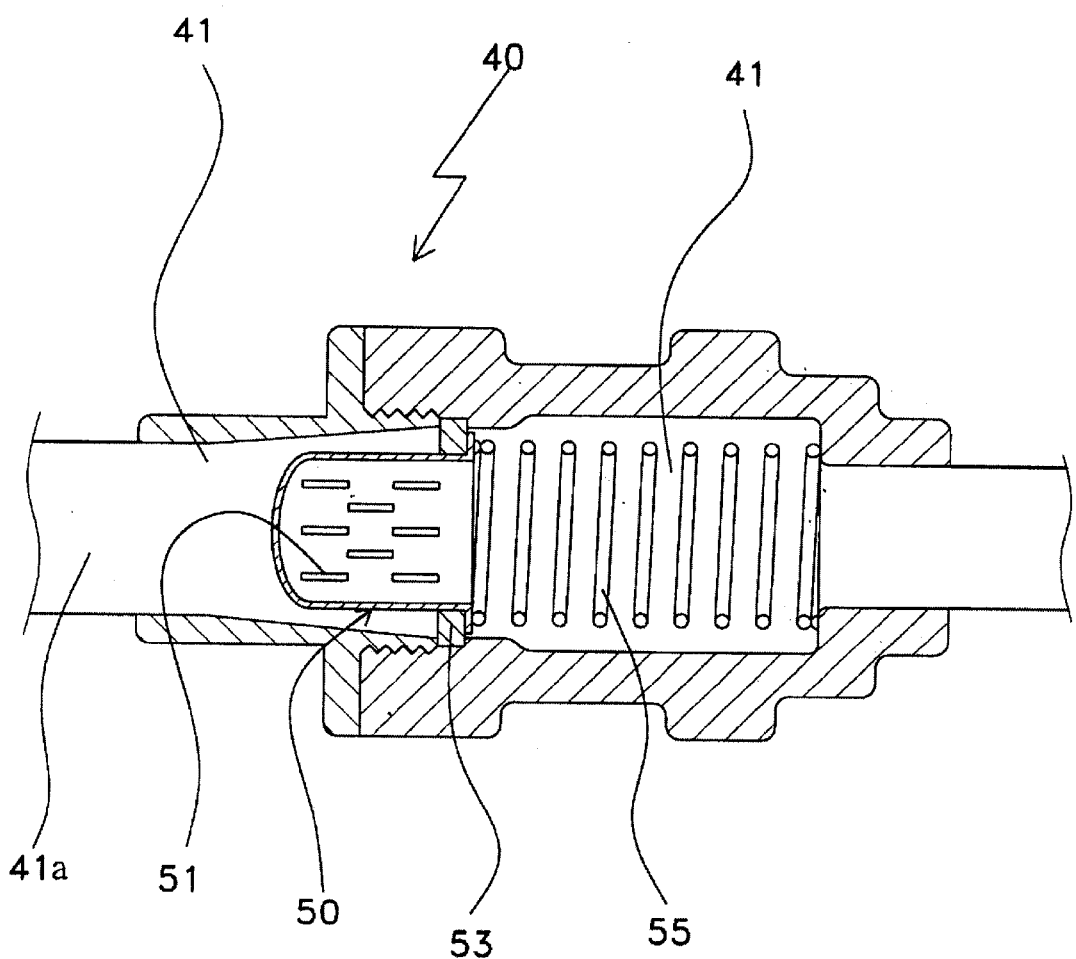
FIG. 1 is a sectional view of a conventional automatic flow control valve.
Figure 2:
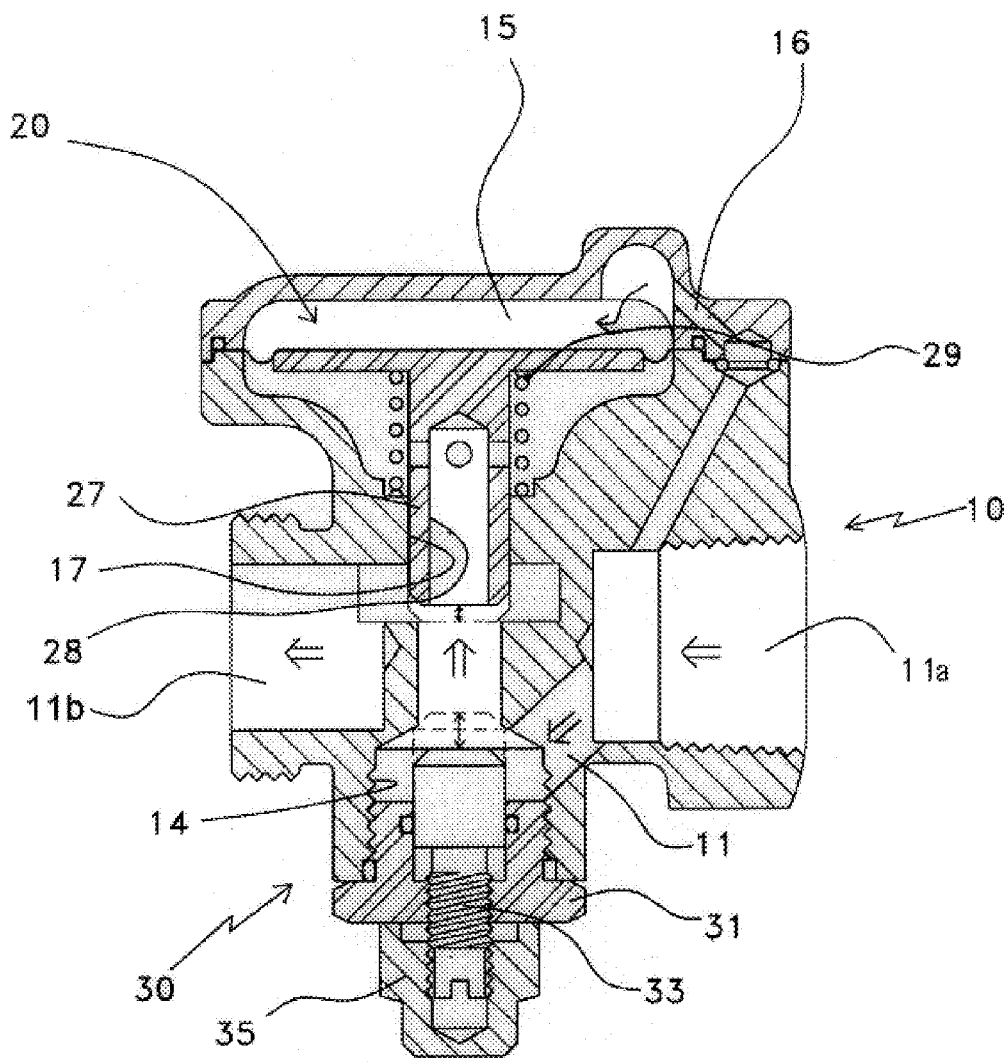
FIG. 2 is a sectional view of an automatic flow control valve according to the present invention.

FIG. 2 is a sectional view of an automatic flow control valve according to the present invention. Referring to FIG. 2, the automatic flow control valve includes a valve body 10 having a chamber 15 formed in the valve body 10, which communicates with a fluid channel 11, a diaphragm 20 disposed in the chamber 15 and having a fluid channel switching shaft 27 connected to one surface of the diaphragm 20, and a flow control means 30 assembled with the valve body 10 and extending toward the fluid channel 11.

The fluid channel 11 is formed in the valve body 10. The chamber 15 containing the diaphragm 20 is disposed above the fluid channel 11, and a control means assembling section 14 assembled with the flow control means 30 is provided under the fluid channel 11. A fluid transfer hole 16 communicating with an entrance port 11a is formed at an upper portion of a side surface of the chamber 15, and an operation hole 17, in which the fluid channel switching shaft 27 protruding from the diaphragm 20 is operated, extends through the valve body 10 from a bottom surface of the chamber 15 toward an exit port 11b of the fluid channel 11. The control means assembling section 14 has a through hole formed therein, which extends from a central portion of the fluid channel 11 to the lower end of the valve body 10 and has a screw portion formed at a cylindrical wall thereof, so that a cover 31, which will be described later, can be assembled with the screw portion.

The diaphragm 20 is a member, which is moved up and down in the chamber 15 by the pressure of fluid. To the lower surface of the diaphragm 20 is connected the fluid channel switching shaft 27, which extends downward by a predetermined length and controls the opening degree of the fluid channel 11. In this case, at a central portion of the fluid channel switching shaft 27 is formed a balance hole 28 communicating with a lower space of the chamber 15, and around the fluid channel switching shaft 27 is assembled a spring 29, which supports the diaphragm 20 upward.

The flow control means 30 includes the cover 31, which is detachably screw-assembled with the control means assembling section 14 of the valve body 10, and an adjusting screw 33, which is screw-assembled with a central portion of the cover 31 and is moved up and down so as to adjust the opening degree of the fluid channel 11. In this case, a cap 35 covering the adjusting screw 33 is disposed at the lower end of the cover 31, so as to prevent the fluid from leaking.

In the automatic flow control valve having the construction as described above, when the pressure of the supplied fluid increases, the pressure is transferred through the fluid transfer hole 16 to the chamber 15, so that the diaphragm 20 is lowered. In result, the fluid channel switching shaft 27 extending from the diaphragm 20 is correspondingly lowered to shut the fluid channel 11, so as to cope with the increased pressure. Therefore, fluid of high pressure is supplied through the fluid channel 11, which is narrowly opened with a small area, so that the quantity of the supplied fluid can be maintained constant.

In contrast, when the pressure of the fluid decreases, the pressure is transferred to the chamber 15, so that the diaphragm 20 is moved up by the restoring force of the spring 29. In result, the fluid channel switching shaft 27 connected with the diaphragm 20 further opens the fluid channel 11 in response to the upward movement of the diaphragm 20, so that fluid of low pressure is supplied through the fluid channel 11, which is open wide, and thereby the quantity of the supplied fluid can be maintained constant.

Meanwhile, in the automatic flow control valve as described above, when it is necessary to properly change the quantity of fluid due to such reasons as a change of a piping system, the quantity of fluid passing through the valve can be adjusted in a simple and easy manner by tightening and loosening the adjusting screw 33 of the flow control means 30.

In the automatic flow control valve according to the present invention as described above, the quantity of fluid passing through the valve can be adjusted easily and precisely through an adjustment of the opening degree of the fluid channel 11, which can be performed by fastening or loosening the adjusting screw 33 assembled with the cover 31 even without disassembling the valve.

Further, in the automatic flow control valve, since the quantity of fluid is controlled while the diaphragm 20 is moved up and down by the pressure of fluid, metallic friction noise is not generated, so that the operation of the valve is performed very quietly. Moreover, since the flow control is carried out by the fluid channel switching shaft 27, which traverses the fluid channel 11, the degree of opening and closing the fluid channel according to the upward and downward movement of the diaphragm 20 is relatively large, so that the valve can flexibly cope with a pressure change in a piping system provided with the valve.

Further, in the automatic flow control valve, alien material accumulated in the valve can be easily eliminated only by separating the cover 31 from the valve body 10. Therefore, it is very simple and easy to repair and maintain the automatic flow control valve of the invention, since it is unnecessary to disassemble the valve one component by one component as is necessary in the prior art.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An automatic flow control valve comprising:
    a valve body including an entrance port, an exit port and a fluid channel extending between the entrance port and the exit port in a first direction along which fluid flows through the valve body;
    a chamber formed in said valve body between the entrance port and the exit port, and extending in a second direction substantially transverse to the first direction, said chamber including an upper chamber portion, a lower chamber portion, and a central chamber portion located between the upper chamber portion and the lower chamber portion in the second direction, wherein the upper chamber portion, the lower chamber portion and the central chamber portion fluidly communicate with one another, and the fluid channel extends through the central chamber portion;
    a fluid transfer hole formed in an upper portion of said valve body for fluidly connecting the entrance port and the upper chamber portion;
    a diaphragm mounted in the upper chamber portion, said diaphragm having a top surface and a bottom surface, and extending substantially in the first direction;
    a fluid channel switching shaft extending in the second direction in the upper and central chamber portions, said fluid channel switching shaft including a top flange portion connected to the bottom surface of said diaphragm, wherein said diaphragm and said fluid channel switching shaft are moved in the second direction by fluid pressure passing through said fluid transfer hole for changing the volume of the central chamber portion;
    a spring mounted around said fluid channel switching shaft between the top flange portion and a lower end of the upper chamber portion; and
    a flow control mechanism mounted in the lower chamber portion and including a cover screwed onto said valve body, an adjustment screw passing through a central through hole in the cover and extending in the second direction toward the central chamber portion to control an opening degree of the fluid channel, and a cap covering the adjustment screw.

2. The automatic flow control valve according to claim 1, wherein the upper chamber portion includes a first compartment positioned above said diaphragm and fluidly connected with said fluid transfer hole, and a second compartment positioned below said diaphragm and fluidly connected with the central chamber portion.

3. The automatic flow control valve according to claim 2, wherein the second compartment and the central chamber portion are fluidly connected by an inner balance hole formed in said fluid channel switching shaft.

4. The automatic flow control valve according to claim 2, wherein fluid pressure received from said fluid transfer hole presses on the top surface of said diaphragm, and fluid pressure received from the central chamber portion presses on the bottom surface of said diaphragm.

5. The automatic flow control valve according to claim 2, wherein said spring is located in the second compartment, and biases said fluid channel switching shaft away from the central chamber portion.

* * * * *